(12) United States Patent
Meier et al.

(10) Patent No.: US 11,399,547 B2
(45) Date of Patent: Aug. 2, 2022

(54) STAMPING DEVICE FOR CREATING ONE OR MORE ROWS OF ENDLESS DOUGH RINGS

(71) Applicant: Werner & Pfleiderer Lebensmitteltechnik GmbH, Dinkelsbühl (DE)

(72) Inventors: Alexander Meier, Dürrwangen (DE); Rudolf Fiedler, Langfurth (DE)

(73) Assignee: Werner & Pfleiderer Lebensmitteltechnik GmbH, Dinkelsbühl (DE)

( * ) Notice: Subject to any disclaimer, the term of this patent is extended or adjusted under 35 U.S.C. 154(b) by 239 days.

(21) Appl. No.: 16/681,739

(22) Filed: Nov. 12, 2019

(65) Prior Publication Data

US 2020/0146301 A1  May 14, 2020

(30) Foreign Application Priority Data

Nov. 14, 2018 (DE) ...................... 10 2018 219 437.8

(51) Int. Cl.
| | |
|---|---|
| *A21C 11/00* | (2006.01) |
| *A21C 11/02* | (2006.01) |
| *A21C 11/12* | (2006.01) |
| *A21C 9/08* | (2006.01) |

(52) U.S. Cl.
CPC .............. *A21C 11/02* (2013.01); *A21C 9/08* (2013.01); *A21C 11/004* (2013.01); *A21C 11/12* (2013.01)

(58) Field of Classification Search
CPC ....... A21C 11/002; A21C 11/04; A21C 11/08; A21C 11/10; A21C 11/12; A21C 11/14; A21C 11/004
See application file for complete search history.

(56) References Cited

U.S. PATENT DOCUMENTS

| | | | | | |
|---|---|---|---|---|---|
| 1,625,649 | A | * | 4/1927 | Gottfried | ............... A21C 11/14 425/348 R |
| 3,604,366 | A | * | 9/1971 | Jarrett | .................... A21C 11/14 425/162 |
| 5,853,783 | A | * | 12/1998 | Rijkaart | ................... A21C 9/00 426/496 |

(Continued)

FOREIGN PATENT DOCUMENTS

| | | |
|---|---|---|
| DE | 19847436 A1 | 4/2000 |
| DE | 102013218071 A1 | 5/2014 |

(Continued)

*Primary Examiner* — Joseph S Del Sole
*Assistant Examiner* — Thu Khanh T Nguyen
(74) *Attorney, Agent, or Firm* — Smartpat PLC (57) ABSTRACT

A stamping device serves to create one or more rows of endless dough rings. The stamping device has a stamping head with a stamping punch or a plurality of stamping punches, wherein each stamping punch is associated with a dough ring row. A dough piece support of the stamping device has a dough piece holder or a plurality of dough piece holders. Each dough piece holder of the dough piece support is associated with one of the stamping punches. An opening for the associated stamping punch is configured in a dough piece holder or in each of the dough piece holders as a die. A stamping device results in which the stamping of dough rings in particular to produce doughnuts can also be used, for example, for baking by hand.

14 Claims, 8 Drawing Sheets

(56) References Cited

U.S. PATENT DOCUMENTS

| | | | |
|---|---|---|---|
| 9,017,058 B2* | 4/2015 | Lazis | A21C 11/04 |
| | | | 425/287 |
| 2006/0040032 A1 | 2/2006 | Peitzmeier et al. | |
| 2012/0207899 A1 | 8/2012 | Serebryany et al. | |
| 2012/0263815 A1 | 10/2012 | Lazis et al. | |

FOREIGN PATENT DOCUMENTS

| | | |
|---|---|---|
| DE | 102013104716 A1 | 11/2014 |
| EP | 1600058 A2 | 11/2005 |
| EP | 2514317 A3 | 11/2015 |

* cited by examiner

STAMPING DEVICE FOR CREATING ONE OR MORE ROWS OF ENDLESS DOUGH RINGS

CROSS-REFERENCE TO RELATED APPLICATIONS

This application claims the priority of German Patent Application, Serial No. DE 10 2018 219 437.8 filed on Nov. 14, 2018, pursuant to 35 U.S.C. 119(a)-(d), the content of which is incorporated herein by reference in its entirety as if fully set forth herein.

TECHNICAL FIELD

The invention relates to a stamping device for creating one or more rows of endless dough rings. The invention moreover relates to a dough processing system with such a stamping device.

BACKGROUND

Stamping devices for creating endless dough rings in industrial quantities are known from EP 1 600 058 B1 and EP 2 514 317 B 1.

SUMMARY

An object of the present invention is to further develop a stamping device of the type mentioned at the beginning in such a way that the stamping of dough rings in particular to produce doughnuts can also be used, for example, for baking by hand.

This object is achieved by a stamping device for creating one or more rows of endless dough rings, with a stamping head with a stamping punch or a plurality of stamping punches, wherein each stamping punch is associated with a dough ring row, with a dough piece support with a dough piece holder or a plurality of dough piece holders, wherein each dough piece holder of the dough piece support is associated with one of the stamping punches, wherein an opening for the associated stamping punch is configured in the dough piece holder or in each of the dough piece holders as a die, with a conveying drive for conveying the dough piece support in a dough piece conveying direction, wherein the dough piece support is connected to an endless traction means.

A dough piece support with a dough piece holder which is associated with the stamping punch, or with a plurality of dough piece holders, in each case associated with the stamping punches, with openings as stamping dies makes it possible to create dough pieces with a high throughput. In principle, with respect to the transporting of the dough piece supports and also with respect to support components for the stamping punch, components of a dough processing system can be used which are already known, for example, in the case of pattern stamping stations from the prior art. In particular, the stamping device can work in tandem with a plurality of dough piece supports in cycles. The stamping head can take the form of a revolving stamping head. A comparable revolving head arrangement is known from EP 2 514 317 B1. In addition to stamping punches, a revolving head of this type can, for example, also have dough pattern stamps. Depending on the design, it is also possible to create different doughnut sizes using the stamping device, in particular in terms of the diameter of a central doughnut hole and/or the doughnut weight. For this purpose, the stamping device can have replaceable stamping punches and/or replaceable dough piece supports. The stamping device can have a pre-pressing punch mounted upstream from the stamping head in the operating sequence. Such a pre-pressing punch is known in principle from EP 1 600 058 B 1.

The conveying drive with the endless traction means enables a plurality of dough piece supports to be conveyed with a relatively low degree of structural complexity. Provided that in each case one of the dough piece supports has a plurality of dough piece holders, the dough piece support is arranged transversely to the dough piece conveying direction such that it is possible for multiple rows of the dough pieces arranged in the respective dough piece support to be processed. When such a conveying drive is used, the advantages of the stamping device with the at least one dough piece support apply to a particularly high degree. The dough piece support can be designed to replace a cup of a cup elevator according to, for example, DE 10 2013 218 071 A1 or to replace a dough trough of a pattern stamping device according to, for example, DE 198 47 436 A1. A chain and/or a belt can be used as the traction means.

In an alternative embodiment of the stamping device, instead of a passage opening in the dough piece holder or the dough piece holders, a mating part which interacts with the stamping punch during stamping can be formed in each of the dough piece holders. A mating body of this type can in particular take the form of a flexible membrane. In the case of such a mating body design of the dough piece holders, the stamping punch is designed as a stamping hollow body, wherein the stamped-out remaining dough is first held in this hollow body and then conveyed away. The conveying away of the stamped-out remaining dough can be assisted by pressurized air being applied to the membrane.

Centering devices for centering the respective openings of the dough piece support relative to the stamping punches and/or for centering the respective dough piece relative to the dough piece holder, results in a dough ring of high quality. A first centering device can be formed by a leading stamping end of the stamping punch being designed as an inclined surface by means of which the stamping punch is centered in the associated die opening during the stamping process relative to the associated dough piece holder. A guide body arrangement with guide bodies can be part of a further centering device and, interacting with a conveying movement of the dough pieces which have not yet been stamped and are conveyed to the stamping head, ensures that the dough pieces are centered in a dough piece arrangement plane along at least one centering dimension. A guide body arrangement of this type can have a number of guide bodies which corresponds to the number of the rows which can be created using the stamping device. The guide bodies can take the form of a pair of inclined surfaces which narrow in a V-shape in the dough piece conveying direction. The whole guide body arrangement can be driven displaceably between an active guide position in which the dough pieces are centered and an inactive guide position in which the guide bodies do not interact with the conveyed dough pieces. A displacement direction of such a displacement drive can in particular run perpendicularly to the arrangement plane of the dough pieces.

A centering device having at least one centering prong, which is attached to the stamping head or the dough piece support, and at least one centering prong guide, interacting with the centering prong for the purpose of centering, which is configured on the dough piece support or on the stamping head, is not complex.

A centering prong guide being configured as a centering bore which has a circumferential bevel as an insertion aid for the centering prong, is operationally reliable. Alternatively or additionally, the centering prong of the centering device can be provided at its free end with a guide cone as an insertion aid into the centering prong guide.

A plurality of centering prongs and centering prong guides interacting therewith for the purpose of centering improves the centering accuracy of the centering device.

A vibration drive for the dough piece support ensures that the dough pieces are centered in the dough piece holders.

The advantages of a guide body arrangement interacting with the conveying drive in order to center the dough rings in at least one centering dimension have already been explained above.

The design embodiment configured such that the dough piece support can be connected to the traction means and/or to the conveying drive via a quick-release lock makes it possible to replace the at least one dough piece support quickly. This is particularly advantageous when the dough piece support is used to replace, for example, a cup or dough trough in a dough processing system. A corresponding quick-release lock can also be provided for fastening the respective stamping punch to the stamping device, which makes it possible to change the stamping punch quickly.

A conveying device for transporting away stamped-out pieces of remaining dough entails hygienic operation of the stamping device. The conveyor belt can be arranged below the stamping head such that, after the stamping, the stamped-out remaining dough falls through the opening in the respective dough piece holder, down onto the conveyor belt. Alternatively or additionally, the stamping punches of the stamping head, or also selected stamping punches of the stamping head, can be designed as hollow stamping bodies, wherein the stamped-out remaining dough is then removed through the hollow body using a correspondingly designed remaining dough conveying device. The remaining dough conveying device can have a suction device for sucking away the stamped-out pieces of remaining dough.

This applies in particular for a conveying device having a conveyor belt with a remaining dough conveying direction which extends transversely to the dough piece conveying direction.

A punch drive for displacing the stamping punch in a stamping motion in such a way that a stamp-and-lift displacement of the respective stamping punch in a lifting direction parallel to a punch axis is overlaid with a rotation of the stamping punch about an axis of rotation which extends along the punch axis, ensures a stamping process which is particularly gentle for the dough piece. A corresponding lift-and-turn stamping displacement can be performed, for example, by means of a screw guide of the stamping punch. When the stamping punch is rotated during the stamping displacement, rotation by an angle of rotation in the region of 90° and in particular by an angle of rotation in the range between 0° and 180° can take place. Angles of rotation in the region of, for example, 45° or 60° are possible. Alternatively, the stamping punch can also be configured as a lifting punch only such that no rotational displacement of the stamping punch takes place during the stamping process.

The advantages of a dough processing system with a stamping device correspond to those which have already been explained above with reference to the stamping device. The stamping device can be configured as one or more stations of the dough processing system which process each dough piece in sequence.

Depending on whether the stamping device is active or not, dough rings, round dough pieces with no hole, and optionally also pattern-stamped bread rolls, pressed bread rolls and split bread rolls can be created using the dough processing system.

An exemplary embodiment of the invention is explained in detail below with the aid of the drawings.

DETAILED DESCRIPTION

Figure 1:
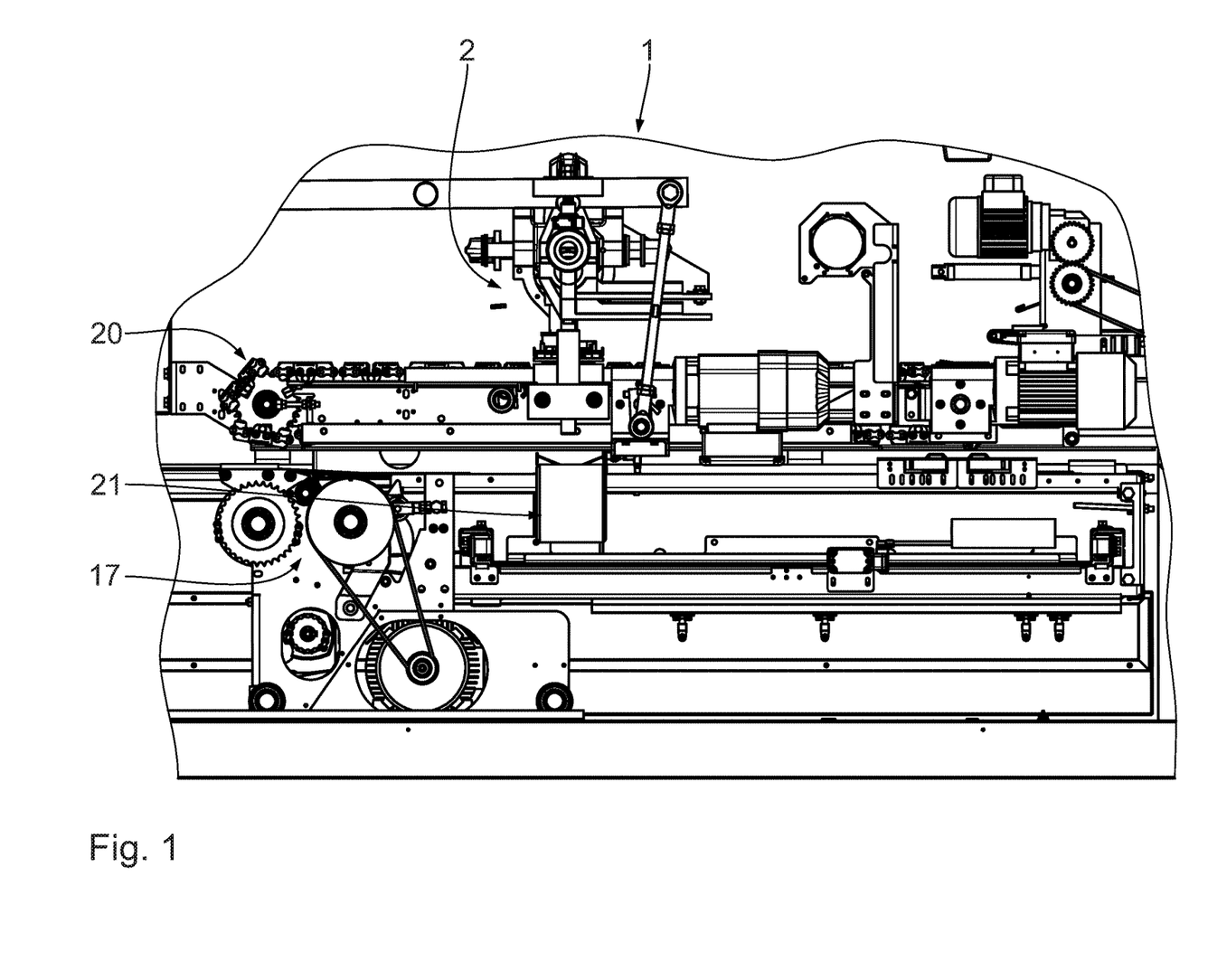
FIG. 1 shows a side view of a section of a dough processing system with a stamping device for creating multiple rows of endless dough rings, in particular doughnuts.

A dough processing system 1, a section of which is shown in FIG. 1, has a plurality of processing stations for dough pieces, a stamping device 2 for creating multiple rows of endless dough rings being part thereof.

Figure 2:
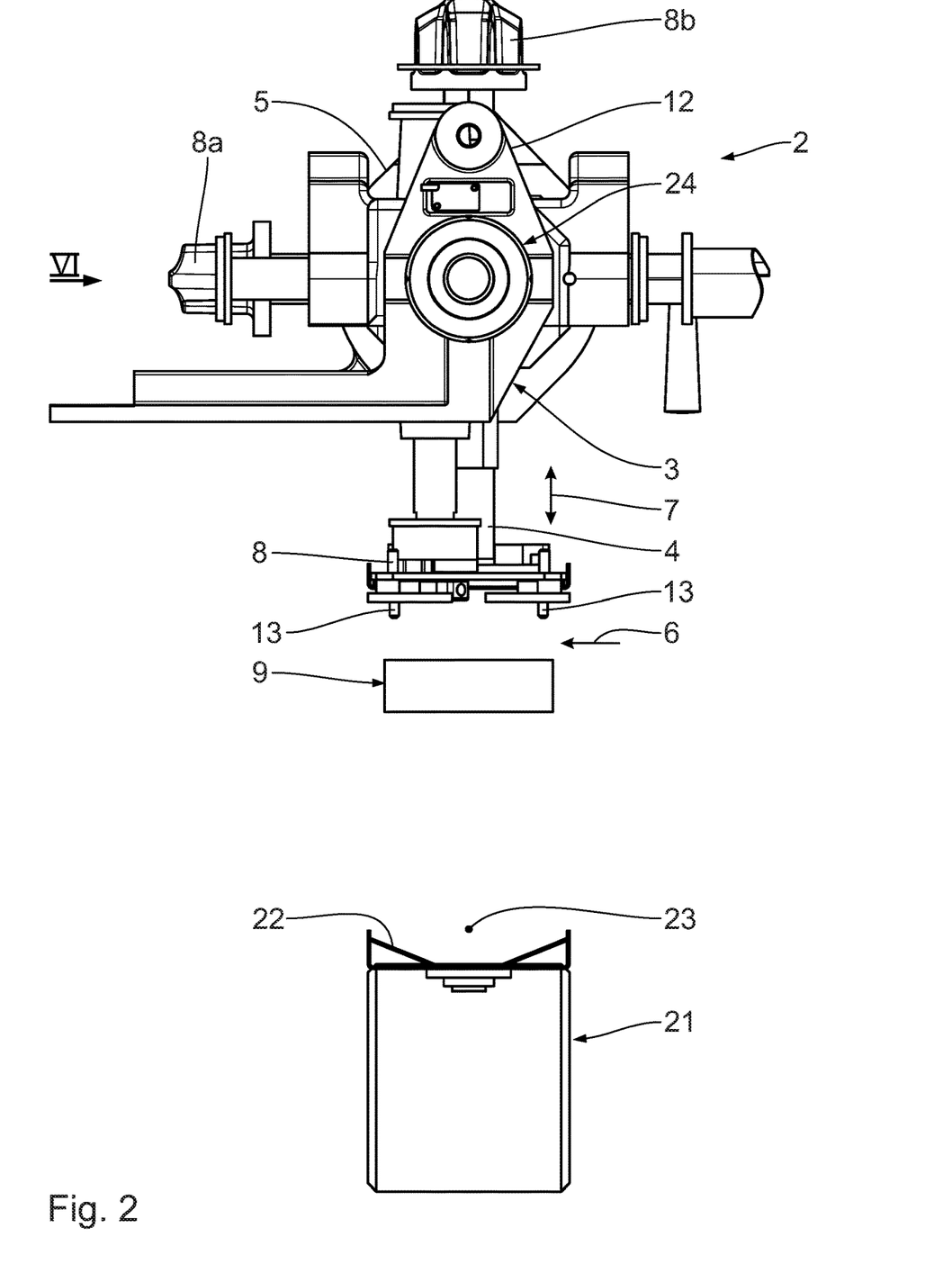
FIG. 2 also shows a side view, enlarged compared with FIG. 1, of the main components of the stamping device.
Figure 3:
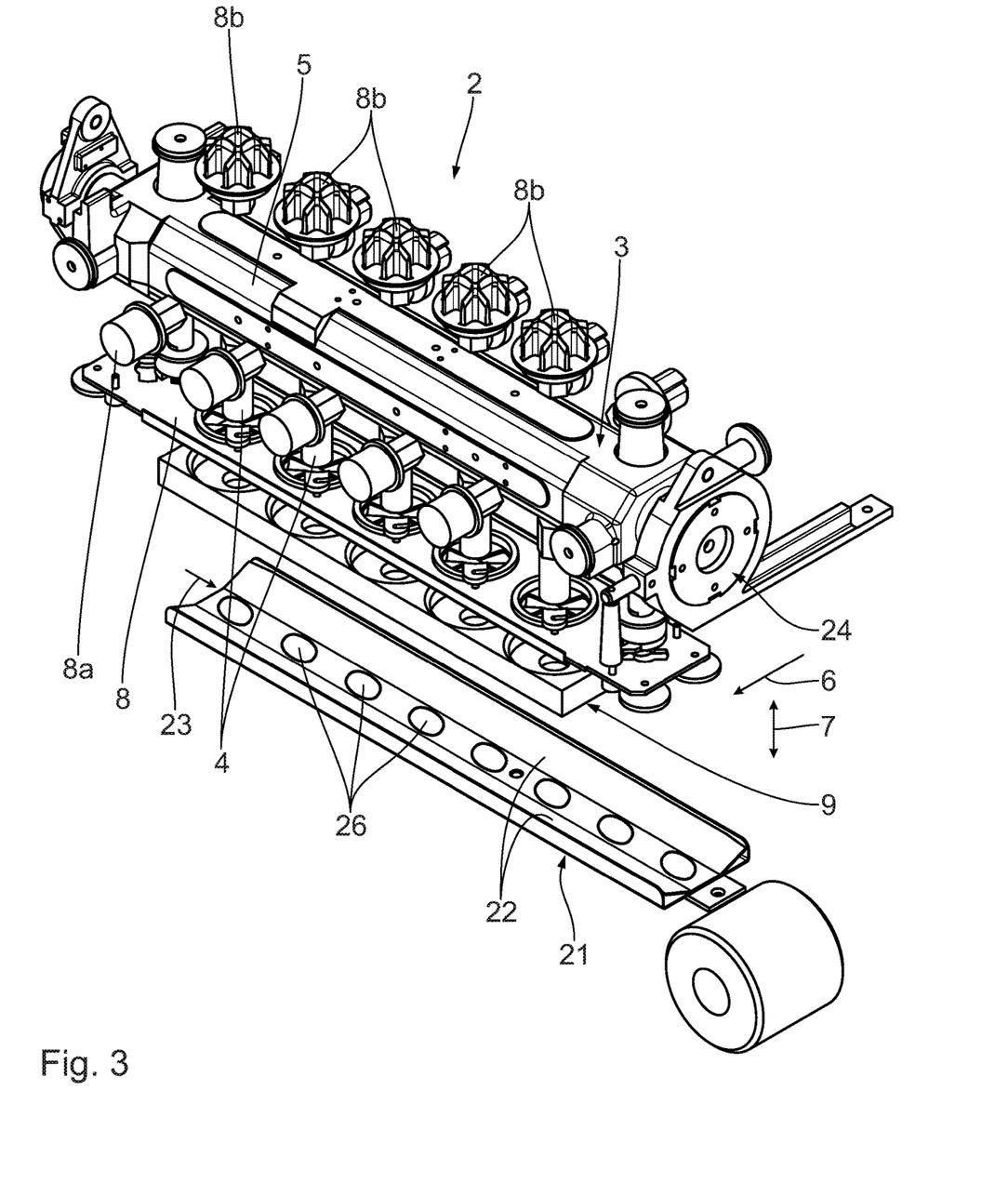
FIG. 3 shows a perspective view of the main components of the stamping device according to FIG. 2.

Main components of the stamping device are shown in greater detail in FIGS. 2 and 3.

The stamping device 2 has a stamping head 3 with a plurality of stamping punches 4, wherein each stamping punch 4 is associated with a row of dough pieces/dough rings. As a whole, the stamping head 3 has five stamping punches 4 arranged next to one another, corresponding to a five-row structure of the dough processing system 1. The stamping punches 4 are held by a carrier beam 5 of the stamping head 3 which extends transversely to a dough piece conveying direction 6 of the dough processing system 1. A stamp-and-lift displacement of the stamping punch 4 in a lifting direction 7 (cf. double-headed arrow in FIGS. 2 and 3) is guided via a guide plate 8 in which respective guide openings for the stamping punches 4 are configured.

Figure 4:
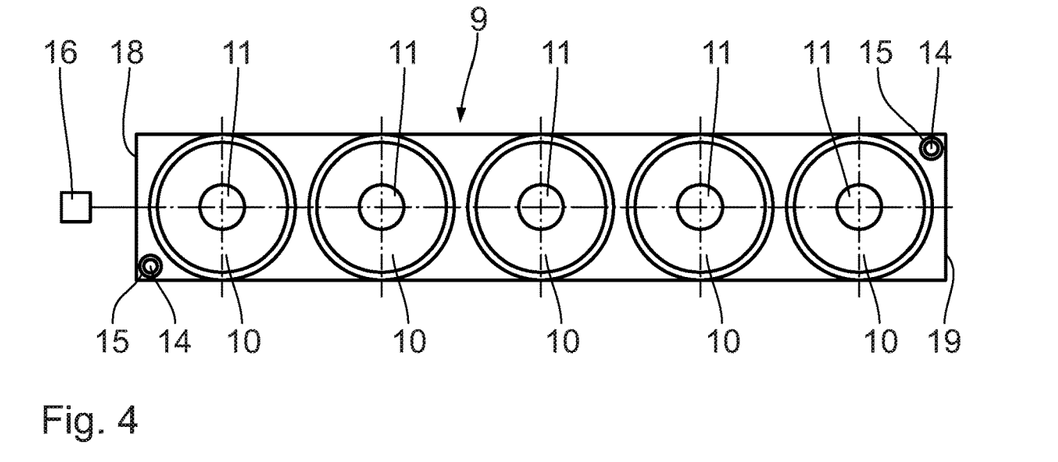
FIG. 4 shows a plan view of a dough piece support of the stamping device, which is also referred to as a doughnut tray.
Figure 5:
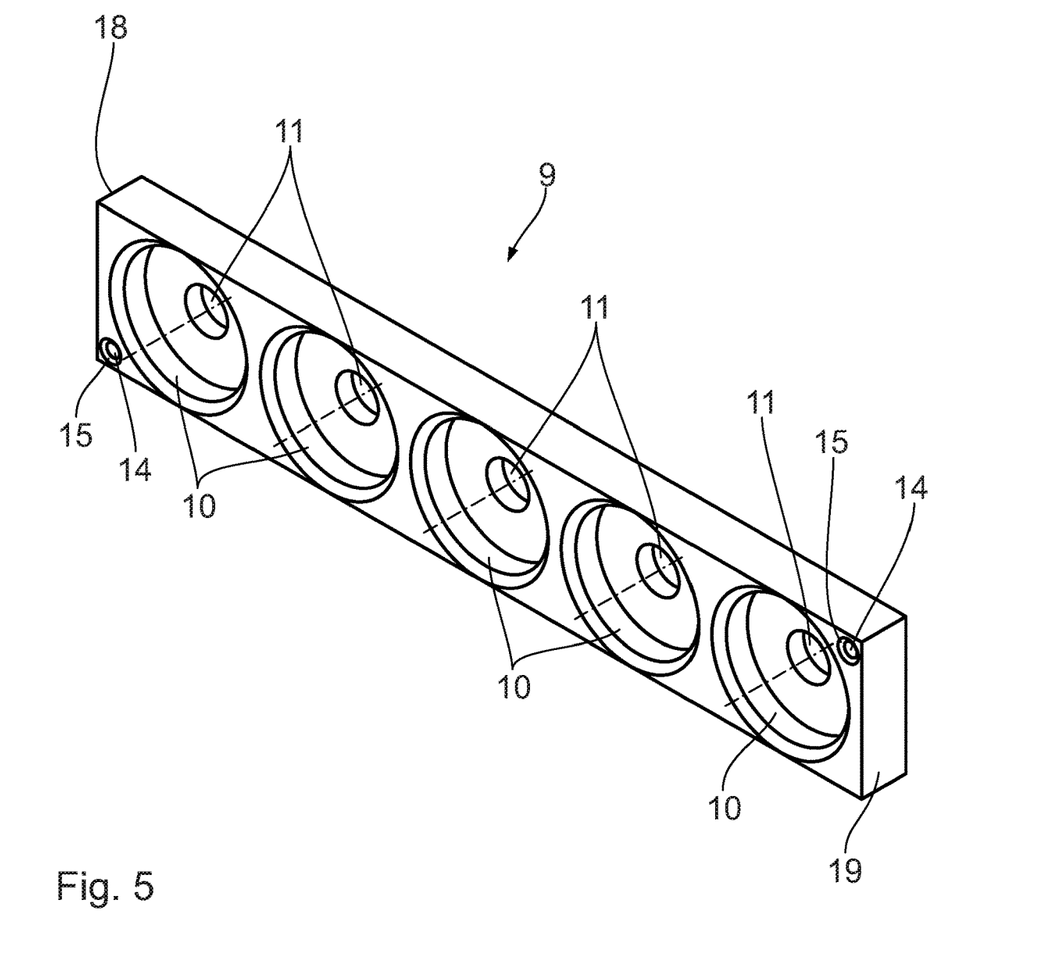
FIG. 5 shows a perspective view of the dough piece support according to FIG. 4.
Figure 6:
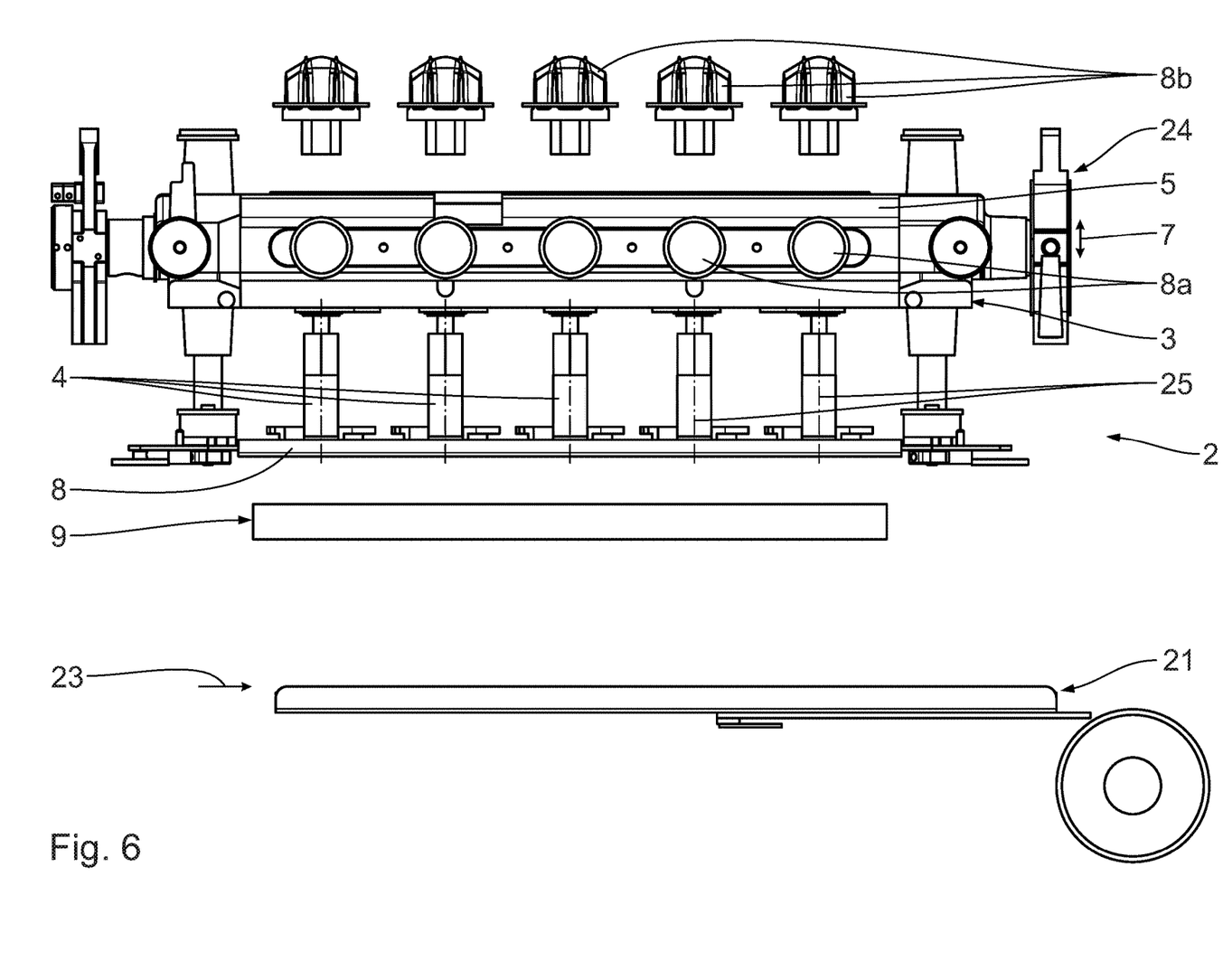
FIG. 6 shows a partially exploded view of the main components of the stamping device 2, viewed in the viewing direction VI in FIG. 2.

Also part of the stamping device 2 is a dough piece support 9 which is shown in detail in FIGS. 4 and 5. The dough piece support 9 has a plurality of dough piece holders 10 and a total of five dough piece holders 10 in the embodiment of the dough piece support 9 shown. Each dough piece holder 10 of the dough piece support 9 is associated with one of the stamping punches 4. An opening 11 for the associated stamping punch 4 is configured in each of the dough piece holders 10 as a die for the stamping device 2. In the operating position, the five dough piece holders 10 arranged next to one another extend transversely with respect to the dough piece conveying direction 6.

The stamping head 3 is designed as a revolving stamping head and has additional multiple rows of different dough piece pattern stamps 8a, 8b in addition to the stamping punches 4. The tool which interacts in each case with the dough pieces can be selected by rotating the revolving head about a pivot axis 12 extending along the carrier beam 5. Details of such a revolving head are described in EP 2 514 317 B 1.

The stamping device 2 has a centering device for centering the respective opening 11 of the dough piece support 9 relative to the stamping punches 4 and for centering the respective dough piece relative to the dough piece holder 10.

The centering device has multiple centering prongs 13 (cf. FIG. 2) which are rigidly connected to the stamping punches in such a way that, in the event of a stamp-and-lift displacement of the stamping punch 4, they are displaced with the latter in the lifting direction 7. The centering device furthermore has multiple centering prong guides 14, each interacting with one of the centering prongs 13, which are made in the dough piece support 9 as centering bores at positions which are at a distance from one another. The centering bores 14 each have a circumferential bevel as an insertion aid 15 for the associated centering prong 13. Alternatively or additionally, the respective centering prong 13 can have a guide cone as an insertion aid into the associated centering prong guide 14.

The centering device can furthermore have a vibration drive 16, indicated schematically in FIG. 4, for the dough piece support 9.

A conveying drive 17 of the dough processing system 1 serves to convey the dough piece support 9 in the dough piece conveying direction 6. The dough piece support 9 is here arranged transversely to the dough piece conveying direction 6 and connected to at least one endless traction means 20 via its two end sides 18, 19 (cf. FIG. 4). The traction means 20 can be at least one chain or at least one belt. In the embodiment illustrated, the dough piece support 9 is designed to replace a cup in a cup elevator, corresponding to a cup elevator which is described in DE 10 2013 218 071 A1. Alternatively, the dough piece support 9 can also be designed to replace a dough trough in a pattern stamping device which is described in DE 198 47 436 A1.

The dough piece support 9 can be connected to the traction means 20 of the conveying drive 17 via a quick-release lock which is not shown in detail in the drawings.

A further conveying device 21 of the stamping device 2 serves to transport away the remaining dough which is stamped out during the stamping using the stamping device 2. Said conveying device has a conveyor belt 22 with a remaining dough conveying direction 23 which extends transversely to the dough piece conveying direction 6.

A punch drive 24 serves to displace the stamping punch 4 in a stamping motion. This displacement in a stamping motion is such that a stamp-and-lift displacement of the stamping punch 4 in the lifting direction 7 is overlaid with a rotation of the respective stamping punch 4 about an axis of rotation which extends along a punch axis 25. This lift-and-turn stamping displacement of the stamping punch 4 can be ensured by means of a corresponding screw guide in the guide plate 8. A rotation of the stamping punch 4 about the axis of rotation 25 during the displacement in a stamping motion can be, for example, in the region of 90° or can also be less than 90°. Depending on the design of the stamping device 2, the angle of rotation of the stamping punch 4 about the axis of rotation 25 can be between 0° and 180° and, depending on the design of the stamping device 2, can also be in the region of 45° or in the region of 60°. Just a lifting displacement of the stamping punch 4 during the stamping, i.e. with no rotational movement, is also possible.

In order to create multiple rows of endless dough rings, the dough processing system 1 works with the stamping device 2, as follows:

As preparation for creating the dough rings, the dough processing system 1 is fitted with dough piece supports 9 which are used, for example, instead of cups in a cup elevator according to DE 10 2013 218 071 A1. For this purpose, quick-release locks of the cups are released, the cups are removed from the cup elevator and are replaced by the dough piece supports 9. As long as only dough rings, for example doughnuts, and round dough pieces are produced using the dough processing system 1, it is not necessary to operate the dough processing system 1 with cups and such a replacement procedure is not necessary. The dough processing system 1 is then activated and dough pieces are placed in the dough piece holders 10 of the dough piece supports 9, upstream from the stamping head 3 in the conveying direction. In order to centre the as yet unstamped dough pieces in the dough piece holders 10, the dough piece supports 9 are vibrated by means of the vibration drive 16 until the dough pieces come to lie centrally in the dough piece holders 10. The dough piece supports 9 are fed in cycles to the stamping head 3 in the conveying direction 6. The respective dough piece support, associated with the stamping head 3 in order to stamp the dough pieces and thus arranged directly below said stamping head, is then centered. For this purpose, at the beginning of the displacement in a stamping motion of the stamping punch 4, the centering prongs 13 engage in the centering prong guides 14 of the associated dough piece support 9. As soon as the centering prongs 13 are engaged in the centering prong guides 14, the dough piece support 9 is centered as a whole with respect to the stamping punch 4 such that, on the one hand, the respective openings 11 of the dough piece support 9 are centered relative to the stamping punches 4 and, on the other hand, the respective dough pieces are centered relative to the dough piece holders 10. The stamping punch 4 is thus automatically centered relative to the dough pieces to be stamped such that, during the stamping step which then follows, the dough pieces are stamped centrally to form dough rings. The actual stamping step can be preceded by a pre-pressing step in which the dough pieces are pre-pressed so that dough material is forced out of the region of the subsequent stamping hole to the outside. This results in a reduced quantity of stamped-out dough, as is known in principle from EP 1 600 058 B1.

Alternatively or additionally to such a central pre-pressing unit, the dough piece can be spread evenly in the respective dough piece holder by means of a flat pressing tool mounted upstream, prior to the stamping step. Neither the pre-pressing tool nor the flat pressing tool are shown in the drawings.

The pieces of remaining dough (cf. the pieces of remaining dough 26 in FIG. 3) fall down through the openings 11, wherein, when the cup elevator is fitted with the dough piece supports 9, care is taken that there is no dough piece support of cup arranged below the respective dough piece support 9 which is active during the stamping, such that the pieces of remaining dough 26 can fall freely onto the conveyor belt 22 of the remaining dough conveying device 21. The pieces of remaining dough 26 are then conveyed away in the remaining dough conveying device 23 and can be fed to a recycling system. Alternatively or additionally to the removal of the pieces of remaining dough by means of the conveyor belt 22, the stamping punches 4 can be designed as hollow bodies with a cutting edge, wherein the stamped-out pieces of remaining dough are then removed via these hollow bodies with the aid of a suction device and fed, for example, to a collection container. A vacuum pump which is used, for example, in industrial vacuum cleaners, can be used as the suction device. In order to assist the removal of the respective stamped-out piece of remaining dough, the respective dough piece holder 10 can be designed with a central membrane to which compressed air is applied.

During the stamping, a combined lift-and-turn movement of the stamping punch 4 takes place with the aid of the stamping punch guide via the guide plates 8, which facilitates the stamping of the dough pieces. The stamped dough rings are then fed for further processing in the dough processing system 1. This further processing can include a fermentation process. After such a fermentation process, as part of the dough processing the dough ring can be pressed flat again by means of a pressure roller and/or by means of a pressure or top belt. Corresponding pressing units are not shown in the drawings.

The punch drive can include at least one servo-drive and/or one geared motor.

Instead of being conveyed transversely, the pieces of remaining dough can in principle also be conveyed longitudinally in the dough piece conveying direction 6.

A further embodiment of a stamping device 31 which can be used in the dough processing system 1 instead of the stamping device 2 is described below with the aid of FIGS. 7 to 9. Components and functions which correspond to those which have already been explained above with reference to FIGS. 1 to 6 have the same reference numerals and are not discussed again in detail.

Figure 7:
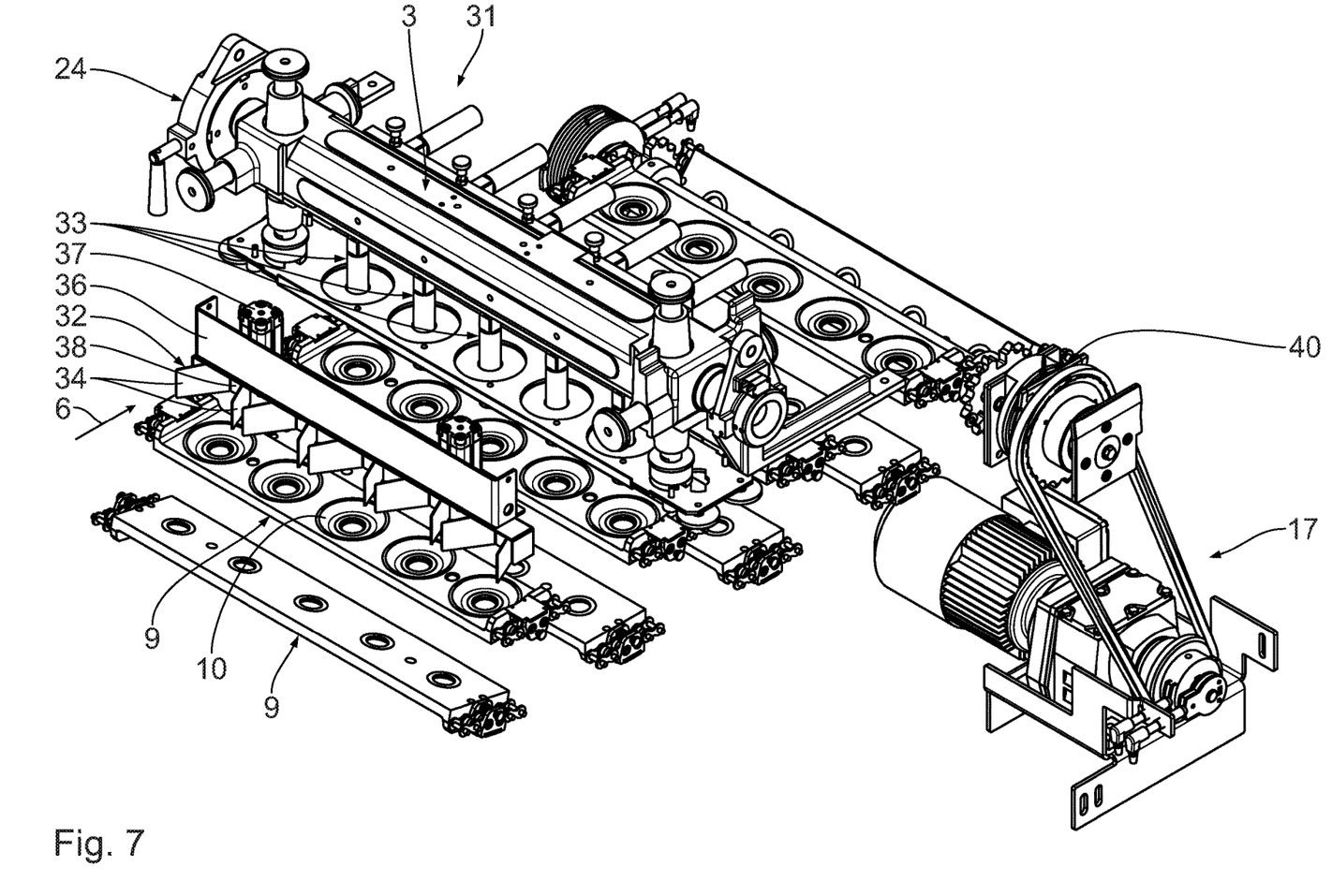
FIG. 7 shows in perspective a further embodiment of a stamping device which can be used as an alternative in the dough processing system and which has a variant of a dough piece centering device.

The traction means 20 has been omitted in FIG. 7, wherein an arrangement of the dough piece supports 9 which circulate owing to the conveyance by means of the traction means 20 has been retained for illustrative purposes. A total of nine circulating dough piece supports 9 are shown, four of the dough piece supports 9 being oriented such that their dough piece holders 10 are facing upwards to hold dough pieces. These four dough piece supports 9, which represent stages in the conveying of the dough rings in the conveying direction 6 before and after the stamping procedure, define a dough piece arrangement plane.

Figure 8:
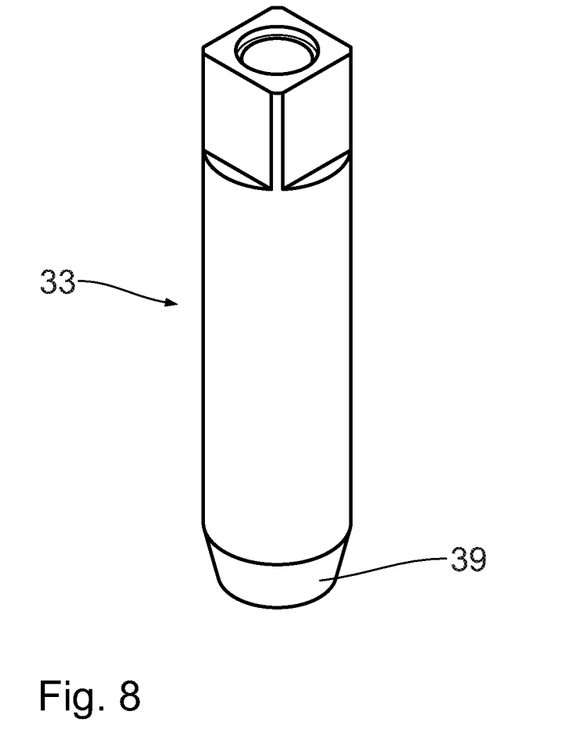
FIG. 8 shows, in perspective, an enlarged view compared with FIG. 7 of a stamping punch of the stamping device according to FIG. 7.
Figure 9:
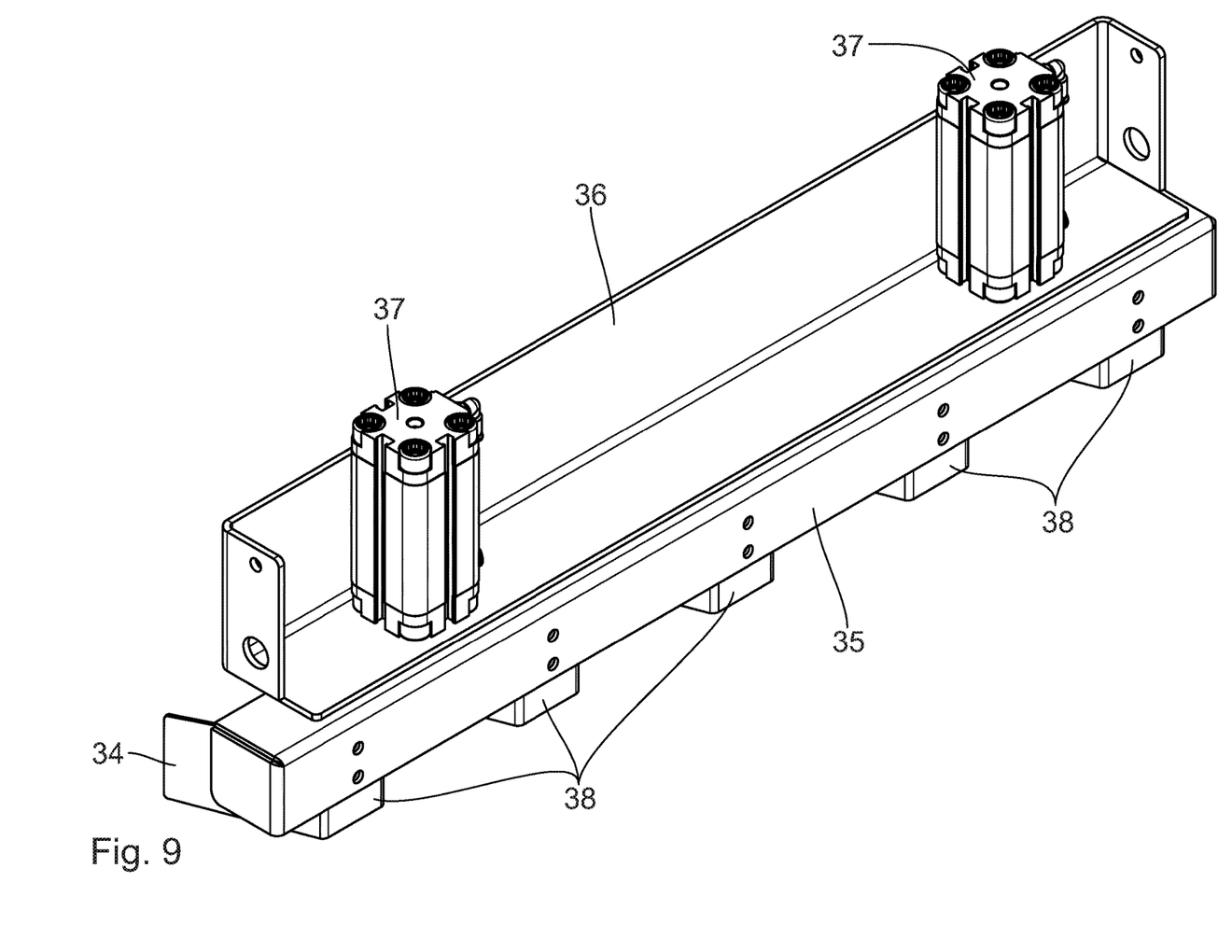
FIG. 9 shows, also in perspective, an enlarged view in a different viewing direction of a guide body arrangement as part of the centering device of the stamping device according to FIG. 7.

In the embodiment according to FIGS. 7 to 9, a further centering device is designed to center the dough pieces at least in one centering dimension transversely to the conveying direction 6, on the one hand, by means of a guide body arrangement 32 and, on the other hand, by means of a centering alternative of stamping punches 33. These centering components which can also be used independently of one another are explained below with additional reference to FIGS. 8 and 9.

The guide body arrangement 32 is arranged upstream from the stamping head 3 in the conveying path of the dough piece supports 9. The guide body arrangement 32 has a number of pairs of inclined surfaces 34, corresponding to the number of rows of dough rings to be created, five in the embodiment shown in FIG. 7, which are designed as guide surfaces for the conveyed dough pieces. The inclined surfaces 34 are arranged vertically with respect to the dough piece arrangement plane. The inclined surfaces 34 of a respective pair of inclined surfaces are designed so that they taper towards each other in a V-shape in the dough piece conveying direction 6. The pair of inclined surfaces are carried by a common support body 35 (cf. FIG. 9) which can be displaced vertically relative to a frame component 36 fixed to the frame, i.e. perpendicularly with respect to the dough piece arrangement plane. This displacement movement of the support body 35 is driven via two servo-motors 37 which are carried by the frame component 36. The pair of inclined surfaces are lowered by means of the servo-motors 37 in a synchronized and cyclical fashion with the conveying movement of the dough piece supports 9, i.e. in a synchronized fashion with the conveying drive 17.

The pairs of inclined surfaces 34 are displaced by means of this vertical drive 37 between a raised position, inactive with respect to a centering function, and a lowered position in which dough pieces arriving in the pairs of inclined surfaces are centered transversely with respect to the dough piece conveying direction 6.

The pairs of inclined surfaces can additionally be designed such that a stop surface 38 which likewise extends vertically and perpendicularly with respect to the dough piece conveying direction and can be seen from the rear in the perspective view according to FIG. 9 extends between the respective inclined surfaces 34. The dough pieces are also centered in the dimension parallel to the dough piece conveying direction 6 by the respective dough pieces to be centered bearing against the stop surfaces 38 in the lowered centering position of the pairs of inclined surfaces.

Instead of inclined surfaces 34 which taper in an inclined fashion, the guide body arrangement 32 can also be designed with inclined surfaces which have an overall rounded shape and can then perform both the function of the inclined surfaces and the function of the bearing surface of the above described embodiment.

The dough piece supports 9 are alternatively or additionally centered relative to the stamping punches 33 (cf. also FIG. 8) with the aid of a conically tapering free punch end section 39. During the stamping procedure with the stamping punch 33, the tapered end of the punch end section 39 first penetrates into the opening 11 of the respective dough piece holder 10 of the dough piece support 9. The conically tapering form of the punch end section 39 ensures that positioning tolerances between the centres of the openings 11, on the one hand, and the centre axes of the associated stamping punch 33, on the other hand, are compensated by an adjusting displacement of the dough piece supports in the dough piece arrangement plane which takes place when the punch end sections 39 penetrate into the openings 11. This ensures that the stamping punches perform the stamping procedure in a centered fashion in the dough piece holders 10.

During the respective centering procedure, the driven dough piece supports 9 can be disconnected from the conveying drive 17 via a clutch (cf. FIG. 7) which is arranged between the drive motor of the conveying drive 17 and the traction means 20.

As an alternative to an overall conical design of the punch end section 39, if a centering function of the stamping punch 33 is required only in one degree of centering freedom, this can also take the form of one or possibly more inclined surfaces at the free end of the stamping punch 33. A number of the stamping punches 33 of the simultaneously working row of punches of the stamping head 3 of the stamping device 31 can have differently oriented inclined surfaces for the purpose of centering with multiple degrees of centering freedom.

In an embodiment which has not been shown, the stamping device can be designed to create precisely one row of endless dough rings. In this case, the stamping device has a stamping punch which is associated with this dough piece row, and a dough piece support with a dough piece holder which in turn is associated with the stamping punch.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations and broad equivalent arrangements that are included within the spirit and scope of the following claims.

Throughout this application and the following claims the indefinite article "a" or "an" does not exclude a plurality. For example, a claim requiring a row of endless dough rings produced by a stamping head with a stamping punch includes two (or more) rows of endless dough rings produced by two (or more) stamping heads with two (or more) stamping punches.

What is claimed is:

1. A stamping device for creating one or more rows of endless dough rings, comprising:
    a stamping head comprising
        a single stamping punch associated with a single dough ring row or
        a plurality of stamping punches, wherein each stamping punch is associated with a dough ring row;
    a dough piece support with
        a single dough piece holder associated with the single stamping punch, wherein an opening for the single stamping punch is configured in the single dough piece holder, the opening forming a die, or
        a plurality of dough piece holders, wherein each dough piece holder of the dough piece support is associated with one of the plurality of stamping punches, wherein an opening for the associated stamping punch is configured in each of the plurality of dough piece holders, the opening forming a die;
    a conveying drive for conveying the dough piece support in a dough piece conveying direction, wherein the dough piece support is connected to an endless traction means, and wherein the endless traction means is a chain or a belt; and
    comprising a centering device for centering the respective openings of the dough piece support relative to the stamping punches.

2. The stamping device according to claim 1, comprising a further centering device for centering the respective dough piece relative to the dough piece holder.

3. The stamping device according to claim 1, wherein the centering device has at least one centering prong, which is attached to one of the group comprising the stamping head and the dough piece support, and at least one centering prong guide, interacting with the centering prong for the purpose of centering, which is configured on one of the group comprising the dough piece support and on the stamping head.

4. The stamping device according to claim 3, wherein the centering prong guide is configured as a centering bore which has a circumferential bevel as an insertion aid for the centering prong.

5. The stamping device according to claim 3, wherein that the centering device has multiple centering prongs and multiple centering prong guides interacting therewith for the purpose of centering.

6. The stamping device according to claim 2, wherein the centering device has a vibration drive for the dough piece support.

7. The stamping device according to claim 2, wherein the further centering device has a guide body arrangement which interacts with the conveying drive in order to center the dough rings in at least one centering dimension.

8. The stamping device according to claim 1, wherein the dough piece support can be connected to at least one of the group comprising the traction means and the conveying drive via a quick-release lock.

9. The stamping device according to claim 1, comprising a conveying device for transporting away stamped-out pieces of remaining dough.

10. The stamping device according to claim 9, wherein the conveying device has a conveyor belt with a remaining dough conveying direction which extends transversely to the dough piece conveying direction.

11. The stamping device according to claim 1, comprising a punch drive for displacing the stamping punch in a stamping motion in such a way that a stamp-and-lift displacement of the respective stamping punch in a lifting direction parallel to a punch axis is overlaid with a rotation of the stamping punch about an axis of rotation which extends along the punch axis.

12. A dough processing system comprising the stamping device as in claim 1.

13. A stamping device for creating one or more rows of endless dough rings, comprising:
    a stamping head comprising
        a single stamping punch associated with a single dough ring row or
        a plurality of stamping punches, wherein each stamping punch is associated with a dough ring row;
    a dough piece support with
        a single dough piece holder associated with the single stamping punch, wherein an opening for the single stamping punch is configured in the single dough piece holder, the opening forming a die, or
        a plurality of dough piece holders, wherein each dough piece holder of the dough piece support is associated with one of the plurality of stamping punches, wherein an opening for the associated stamping punch is configured in each of the plurality of dough piece holders, the opening forming a die; and
    a conveying drive for conveying the dough piece support in a dough piece conveying direction, wherein the dough piece support is connected to an endless traction means, and wherein the endless traction means is a chain or a belt,
    wherein the dough piece support can be connected to at least one of the group comprising the traction means and the conveying drive via a quick-release lock.

14. The stamping device according to claim 1, wherein the opening is configured as a passage opening.

* * * * *